(12) United States Patent
Gault et al.

(10) Patent No.: US 7,928,855 B2
(45) Date of Patent: Apr. 19, 2011

(54) DIAGNOSTIC DEVICE FOR A WASHING APPLIANCE, AND ASSOCIATED APPARATUS AND METHOD

(75) Inventors: Gregory Gault, Greenville, NC (US); Gary Wayne Fisher, Goodlettsville, TN (US)

(73) Assignee: Electrolux Home Products, Inc., Cleveland, OH (US)

( * ) Notice: Subject to any disclaimer, the term of this patent is extended or adjusted under 35 U.S.C. 154(b) by 337 days.

(21) Appl. No.: 12/031,887

(22) Filed: Feb. 15, 2008

(65) Prior Publication Data

US 2009/0205690 A1 Aug. 20, 2009

(51) Int. Cl.
*G08B 21/00* (2006.01)
(52) U.S. Cl. .......... 340/635; 340/664; 134/57 D
(58) Field of Classification Search .......... 340/635, 340/636.12, 636.16, 653, 657, 664, 815.4, 340/815.41, 815.45, 870.16; 323/318; 700/90; 134/57 D, 58 D, 18
See application file for complete search history.

(56) References Cited

U.S. PATENT DOCUMENTS

| | | | |
|---|---|---|---|
| 4,241,400 A * | 12/1980 | Kiefer | 700/90 |
| 4,245,309 A | 1/1981 | Kiefer | |
| 4,509,543 A | 4/1985 | Livingston et al. | |
| 4,977,394 A | 12/1990 | Manson et al. | |
| 5,378,874 A | 1/1995 | Holling et al. | |
| 5,398,251 A | 3/1995 | Shim | |
| 5,896,086 A | 4/1999 | Ida | |
| 6,112,754 A | 9/2000 | Bradley | |
| 6,956,461 B2 * | 10/2005 | Yoon et al. | 340/310.11 |
| 7,095,333 B2 | 8/2006 | Graff | |
| 7,177,712 B2 | 2/2007 | Blair et al. | |
| 7,197,429 B2 | 3/2007 | Rosa | |
| 7,200,450 B2 | 4/2007 | Boyer et al. | |
| 7,436,317 B2 * | 10/2008 | Becke et al. | 340/815.48 |
| 2005/0235306 A1 * | 10/2005 | Fima | 725/10 |
| 2007/0247134 A1 * | 10/2007 | Ryan et al. | 323/318 |
| 2008/0231468 A1 * | 9/2008 | Myllymaki | 340/870.17 |

FOREIGN PATENT DOCUMENTS

| | | |
|---|---|---|
| DE | 3404211 A1 | 8/1985 |
| EP | 0 068 266 A1 | 1/1983 |
| EP | 0 262 584 A | 4/1988 |
| GB | 2 256 580 A | 12/1992 |

* cited by examiner

*Primary Examiner* — Van T. Trieu
(74) *Attorney, Agent, or Firm* — Alston & Bird LLP

(57) ABSTRACT

A diagnostic device for a washing appliance, and associated apparatus and method are provided. A control unit is in communication with at least one operational component of the washing appliance and with at least one control switch device. The control unit is responsive to the at least one control switch device to control the at least one operational component. The control unit is further configured to monitor the at least one operational component so as to identify a failure thereof, and to provide an indicia of the failure. A panel member is associated with the control unit, and includes an indicia of the at least one operational component. The at least one operational component indicia is configured to cooperate with the corresponding failure indicia so as to provide a perceptible identification of the at least one operational component experiencing the failure.

32 Claims, 4 Drawing Sheets

DIAGNOSTIC DEVICE FOR A WASHING APPLIANCE, AND ASSOCIATED APPARATUS AND METHOD

BACKGROUND OF THE INVENTION

1. Field of the Invention

Embodiments of the present invention relate to washing appliances and, more particularly, to a diagnostic device for a washing appliance, and an apparatus and method associated therewith.

2. Description of Related Art

Certain washing appliances, such as a dishwasher, include a circuit board or other control unit that is otherwise in electrical communication (via a wiring harness) with one or more controller elements and/or user interfaces mounted in a front door (i.e., control switches mounted to the top of the door or the front of the door) of the appliance. Various operational components of the dishwasher are thus controlled via the circuit board/control unit through various commands for controlling such components initiated through the controller element/user interface mounted on the door.

In some instances, the status information, regarding particular operational components of the appliance, available through the controller element/user interface may be limited. In other instances, the circuit board/control unit may not be readily accessible (i.e., mounted within the base of a dishwasher). As such, if a problem occurs with the dishwasher after the dishwasher has been installed, a technician must often uninstall the entire dishwasher, and possibly disassemble much of the dishwasher, in order to troubleshoot the problem. Even then, the "repair" may often involve replacing components thought to be related to the apparent symptoms, until the problem is resolved. Such an approach is often time consuming, inefficient, and expensive (i.e., where the repair involves replacing components to solve the problem) and may, in some instances, involve multiple installations and uninstallations of the dishwasher, and/or multiple service calls (i.e., if parts must be ordered).

Thus, it would be desirable to provide a diagnostic device and associated method for identifying the source of a component failure in the washing appliance, in the event that a problem occurs. Such a solution should desirably be conveniently or readily accessible, whether to the owner of the appliance or the service person. Further, such a solution should desirably provide a perceptible indication of the one or more components of the appliance responsible for the failure, and should desirably do so in a clear and particular manner.

BRIEF SUMMARY OF THE INVENTION

The above and other needs are met by the present invention which, in one embodiment, provides a diagnostic device for a washing appliance. Such a diagnostic device comprises a control unit adapted to be in communication with at least one operational component of the washing appliance and with at least one control switch device, wherein the control unit is responsive to the at least one control switch device to control the at least one operational component. The control unit is further configured to monitor the at least one operational component so as to identify a failure thereof, and provide an indicia of the failure. A panel member is associated with the control unit, and includes an indicia of the at least one operational component, whereby the at least one operational component indicia is configured to cooperate with the corresponding failure indicia so as to provide a perceptible identification of the at least one operational component experiencing the failure.

Another aspect of the present invention comprises a washing appliance, including at least one operational component and at least one control switch device. A control unit is in communication with the at least one operational component and with at least one control switch device, wherein the control unit is responsive to the at least one control switch device to control the at least one operational component. The control unit is further configured to monitor the at least one operational component so as to identify a failure thereof, and provide an indicia of the failure. A panel member is associated with the control unit, and includes an indicia of the at least one operational component. The at least one operational component indicia is configured to cooperate with the corresponding failure indicia so as to provide a perceptible identification of the at least one operational component experiencing the failure.

Another aspect of the present invention comprises a method of identifying component failure in a washing appliance. Such a method includes identifying a failure of at least one operational component of the washing appliance by monitoring the at least one operational component with a control unit, wherein the control unit is in communication with at least one control switch device and is responsive thereto to control the at least one operational component. An indicia of the failure is then provided, and communicated with an indicia of the corresponding at least one operational component, the at least one operational component indicia being operably engaged with a panel member associated with the control unit, so as to provide a perceptible identification of the at least one operational component experiencing the failure.

Aspects of the present invention thus provide significant advantages as further detailed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 2:
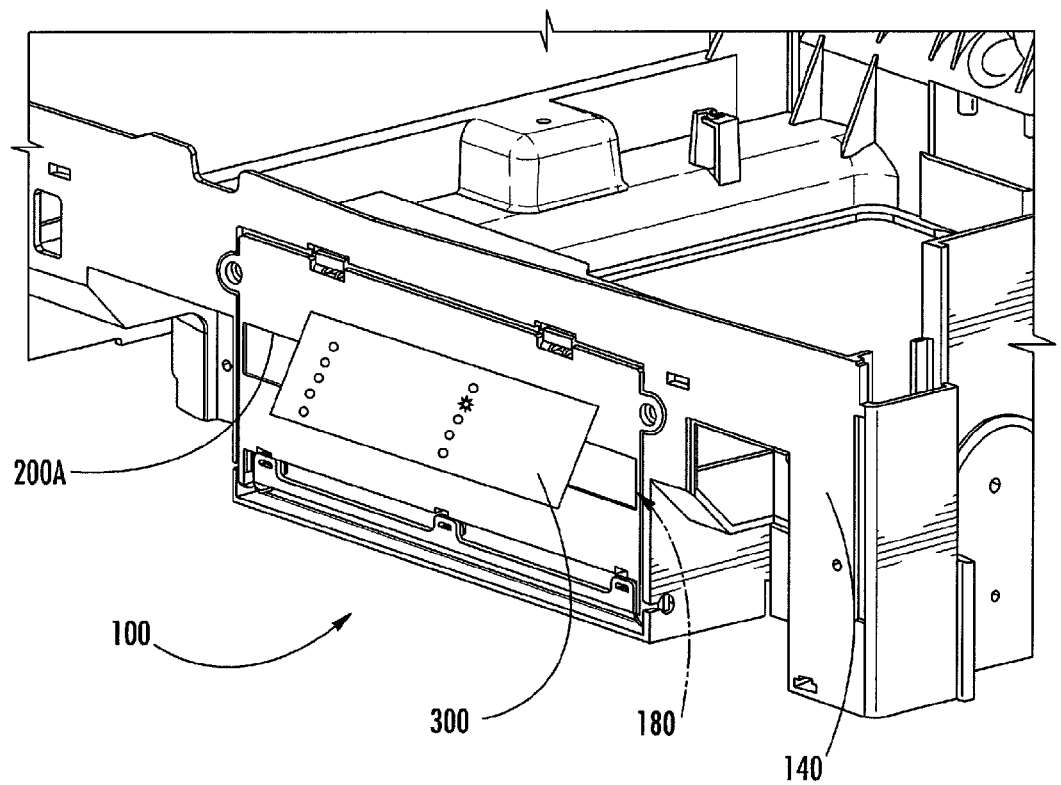
FIG. 2 is a perspective partial view of a dishwasher device having a diagnostic device according to one embodiment of the present invention.
Figure 3:
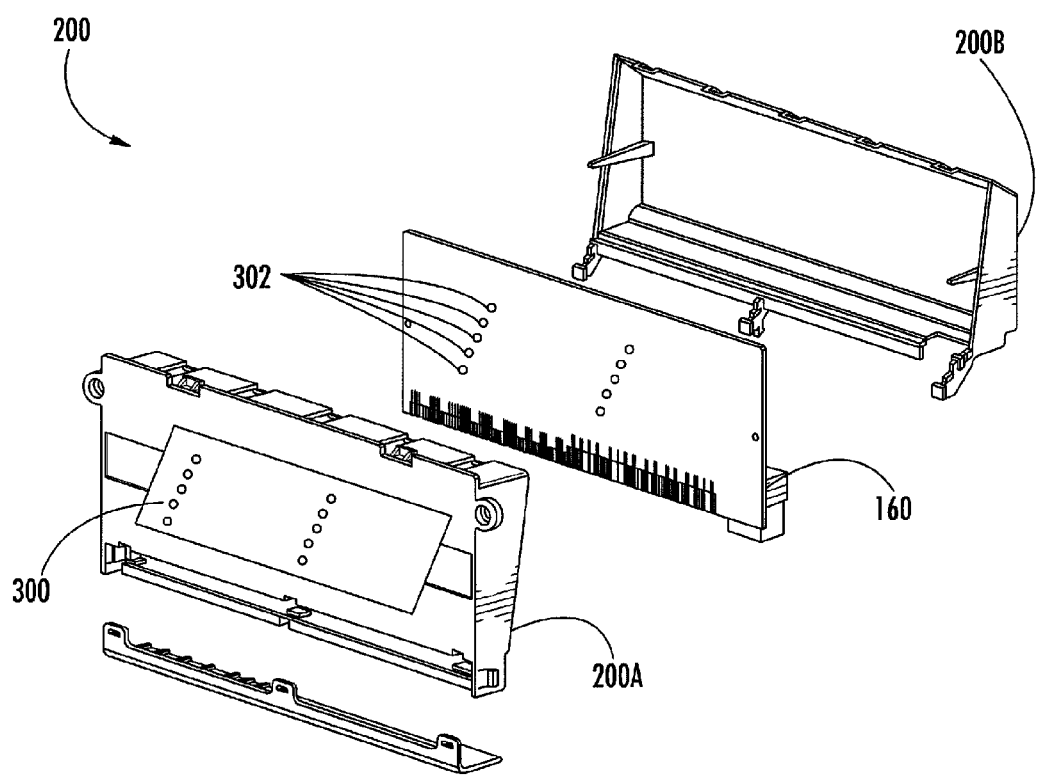
Figure 4:
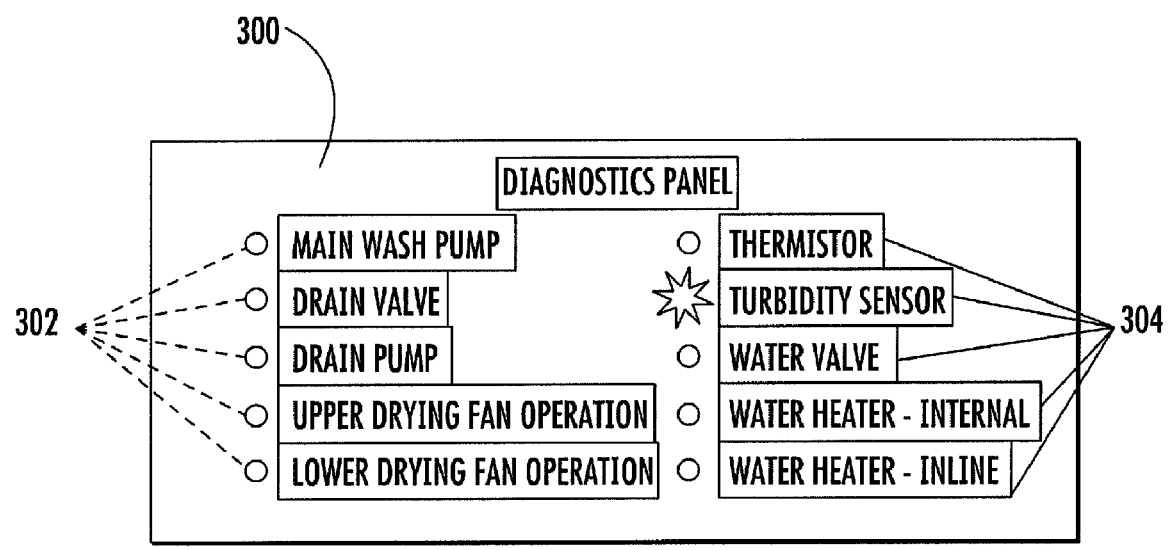

FIG. 3 schematically illustrates an exploded perspective of a diagnostic device associated with a control unit within a control unit housing assembly, according to the embodiment of the present invention shown in FIG. 2; and FIG. 4 is a front view of a panel member associated with a diagnostic device, the panel member having indicia associated therewith and corresponding to various operational components of a dishwasher device according to one embodiment of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
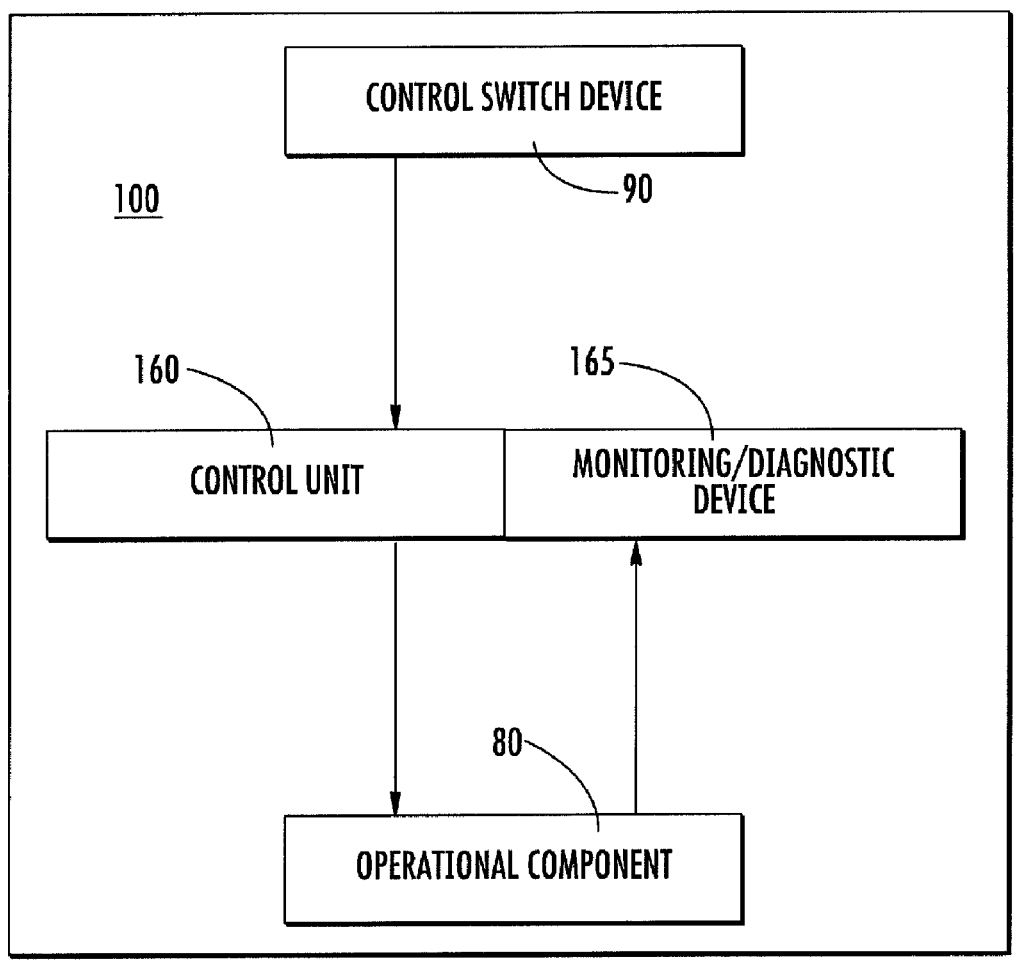
FIG. 1 is a schematic of control system for operational components of a washing appliance implementing a diagnostic device according to one embodiment of the present invention.

FIGS. 2 and 3 illustrate one embodiment of a diagnostic device/feature for a washing appliance, such as a dishwasher device 100, according to the present invention. Though a washing appliance is discussed herein in terms of a dishwasher, one skilled in the art will appreciate that other washing appliances, such as clothes washing machines, or even other non-washing appliances, such as refrigerators, stoves, and the like, may also benefit from the various aspects of the disclosure herein, and that the examples presented herein are not intended to be limiting in this respect. According to one aspect, the diagnostic device 165 is configured to give a consumer/serviceman a visual indication or otherwise perceptible identification of the source of an operational component failure in the event that a problem with the washing appliance is encountered. Such a diagnostic device 165 may be generally integrated with a washing appliance, such as a dishwasher device 100 (see, e.g., FIG. 1). As shown in FIG. 2, the dishwasher device 100 generally comprises a tub (not shown) supported by a base 140, wherein both the tub and the base 140 define respective forward ends, each adapted to face outwardly from any cabinet in which the dishwasher device 100 is installed. In some instances, the front end defines an access opening of the tub, through which dishware is loaded and unloaded with respect to the dishwasher device 100.

As shown in FIG. 3, such dishwasher devices 100 may be electronically-controlled, implementing an electronic control unit 160 ("ECU") for interacting with various operational components 80 (i.e., circulation pump, drain pump, water valve) of the dishwasher device 100 to control a dishwashing process. In such instances, the performed functions (i.e., wash, rinse, drain) or cycles (i.e., heated dry) may be selected by a user via one or more appropriate selector or control switch devices 90, such as one or more switches, buttons, knobs, or any combinations thereof. The selector devices 90 may be disposed remotely with respect to the ECU 160. For example, such selector devices 90 may be disposed about the upper end of the door or about the front or forward facing surface (not shown) of the dishwasher device 100 for facilitating interaction therewith by a user. The electrical supply from the house wiring to the dishwasher device 100 may be engaged with designated electrical terminals of the dishwasher device 100, and/or with the ECU 160. Under this arrangement, the ECU 160 is responsive to the one or more appropriate selector or control switch devices 90 to control one or more of the various operational components 80 (see, e.g., FIG. 1).

Though not necessary to some embodiments of the present invention, some aspects include provisions for readily accessing the ECU 160. For example, in some instances, the base 140 may be configured so as to define a compartment 180 about the forward end thereof, wherein the compartment 180 is configured to receive the ECU 160, as shown in FIG. 2. With the compartment 180 disposed about the forward end of the base 140, the electrical supply from the house wiring, as well as the connections (i.e., wires) connecting the ECU 160 to the control switch devices 90 and the various operational components 80, may be directed through the compartment 180 or otherwise engageable with the ECU 160 via the compartment 180. As such, the dishwasher device 100 may be installed, for example, within a cabinet structure, prior to the electrical connections to the dishwasher device 100 being established. However, in some instances, the electrical connections may be established elsewhere about the dishwasher device 100, and then appropriate power leads (i.e., wires) are directed to or through the compartment 180. With the dishwasher device 100 being configured to receive the ECU 160 in the compartment 180 about the forward end of the base 140, the ECU 160 is readily accessible without requiring removal of the dishwasher device 100 from the cabinet, or extensive disassembly of the dishwasher device 100. For example, the ECU 160/compartment 180 may be covered, with respect to the forward side of the dishwasher device 100, by a removable toe kick plate (not shown), wherein removal of the toe kick plate allows the ECU 160 to be viewed and accessed from the forward side of the dishwasher device 100. Although the ECU 160 may be easily accessible in this manner, a serviceman would still likely be needed to diagnose problems associated with the dishwasher device 100.

As such, aspects of the present invention are thus directed to a diagnostic device 165 for the dishwasher device 100, configured to provide the consumer/serviceman a visual indication or other perceptible identification of the source of an operational component failure in the event that a problem with the dishwasher device 100 is encountered. In some instances, the ECU 160 may be configured to include, or may be readily configured to include, a diagnostic device 165 having diagnostic circuitry and/or monitoring circuitry, wherein such a diagnostic device 165 is configured to be in communication with various operational components 80 of the dishwasher device 100 for monitoring such operational components 80 and identifying or diagnosing the one or more faulty operational components 80 associated with a failure of the dishwasher device 100. For example, such diagnostic/monitoring circuitry may be configured to monitor the electric current consumed by various operational components 80, whereby interruption of the electrical current associated with a particular operational component 80 can be associated with the failure thereof. Such current monitoring may be accomplished, for example, using a current-measuring device, such as an ammeter device, associated with the diagnostic device 165 of the ECU 160. However, even after identifying the problem/faulty operational component 80, this identification should desirably be communicated to the consumer/serviceman in a "user-friendly" manner. Accordingly, the diagnostic device 165 of the ECU 160 may be further configured to provide an indicia of a diagnosed failure of a corresponding operational component 80.

As shown in FIGS. 2 and 3, in one particular embodiment, the ECU 160 (or control unit, control device, or circuit board) is mounted within a control unit housing assembly 200 (otherwise referred to as "housing 200"), which may be formed of one or more cooperable portions 200A, 200B configured to contain the ECU 160. For example, the housing 200 may be injection-molded in two complementary portions 200A, 200B of a thermoplastic material, wherein the ECU 160 is disposed in one portion 200A of the housing 200, and the other portion 200B of the housing 200 cooperates therewith to enclose the ECU 160. In such a manner, the ECU 160 is protected, for example, from water and dirt ingress. As previously discussed, the ECU 160 within the housing 200 may be configured to be received by a compartment 180 disposed about the forward side of the base 140 of the appliance. Once the ECU 160/housing 200 is received in the compartment 180, the forward side of the base 140 may be covered by a toe kick panel (not shown), which essentially provides an aesthetic front cover for the base 140.

As previously discussed, some embodiments of the diagnostic device 165 of the ECU 160 may provide an indicia of a diagnosed failure of a corresponding operational component 80. For example, the ECU 160 may be configured to actuate one or more indicator elements 302, with each indicator element 302 being, for instance, a light source configured to emit light as the failure indicia. In some aspects, the at least one indicator element 302 may comprise, for example, one or more light emitting diodes (LED's) operably engaged with the ECU 160. In still other aspects, each indicator element 302 may correspond to a failure of a particular operational component 80 identified by the diagnostic device 165 monitoring the current consumed by the various operational components 80 of the dishwasher device 100. In such a configuration, the indicator element(s) 302 may be operably engaged with the ECU 160 (i.e., mounted thereto in electrical communication therewith) and configured to emit light outwardly therefrom. Accordingly, light emitted by a particular indicator element 302 may be indicative of a failure of a particular operational component 80. However, the indicator element 302 by itself may not be a sufficient indicator of the problem source that will be perceptible by the consumer or the serviceperson.

Accordingly, further aspects of the present invention may associate a panel member 300 with the indicator element(s) 302 of the ECU 160. In some instances, the panel member 300 may include an indicia of a corresponding one of the operational components 80, particularly an operational component 80 experiencing a fault or failure. For example, the panel member 300 may be configured with an indicia comprising a stencil or other labeled member having at least one transparent, or at least partially translucent, portion (i.e., each transparent/translucent portion may have a label corresponding to a particular operational component 80). According to such a configuration, the operational component indicia of the panel member 300 may be configured to cooperate with the corresponding indicator element 302 of the ECU 160 so as to provide a perceptible identification of the corresponding operational component 80 experiencing the failure. That is, a particular indicator element 302 actuated by the ECU 160 in response to a detected and identified failure of a particular operational component 80, may emit light through a corresponding transparent/translucent portion of the stencil/labeled member (i.e., as a solid or flashing light through panel member 300) to provide a perceptible identification of the particular faulty operational component 80 (or component that must be replaced) through the panel member 300, as particularly shown in FIG. 2.

The panel member 300 may be operably engaged with the ECU 160 in many different manners. For example, panel member 300 may be operably engaged with the control unit housing assembly 200 such that the panel member 300 forms an externally-visible surface of the control unit housing assembly 200. With the housing 200 mounted within the compartment 180 in the base 140, the perceptible identification of the particular faulty operational component 80 (or component that must be replaced) is viewable through the panel member 300, without accessing the ECU 160 within the housing 200 (when the readily-removable toe kick panel is removed). Further, in such a configuration, the panel member 300/ECU 160 are both disposed about the forward side of the washing appliance such that the panel member 300 is accessible and viewable from the forward side. In such instances, the panel member 300 provides the perceptible identification towards the forward side of the dishwasher device 100, wherein the consumer/serviceman may merely need to remove the front toe kick panel to ascertain the problem or faulty operational component 80 from the lighted portion of the panel member 300.

In one example, as shown in FIG. 4, the panel member 300 may be stenciled or otherwise labeled or patterned to include various indicia 304 each associated with a particular operational component 80. In some instances, each indicia 304 may be associated with a corresponding indicator element 302, such as an LED, engaged with the ECU 160. In this example, the panel member 300 may include individual indicia 304 associated with operational components 80 of a dishwasher device 100, such as a main wash pump, a drain valve, a drain pump, an upper drying fan, a lower drying fan, a thermistor, a turbidity sensor, a water valve, an internal water heater, and an inline water heater, for providing perceptible identification of failure or fault associated therewith. Such operational components 80 may be associated with a dishwasher device 100, as will be appreciated by those having ordinary skill in the art. As particularly shown in FIG. 4, the indicator element 302 of the ECU 160 associated with a fault/failure of the turbidity sensor operational component is actuated to emit light as an indicia of the failure, whereby the emitted light is directed through the portion of the panel member 300 corresponding to or otherwise labeled "turbidity sensor" so as to provide a perceptible (i.e., visible) identification that a problem/failure has occurred with regard to the turbidity sensor of the dishwasher device 100. To that end, the problem/fault/failure may be readily diagnosed to the operational component level by a consumer/serviceperson.

It is envisioned that the diagnostic device/feature may be configured in many different manners. For example, the indicator element(s) 302 may actually be engaged with the housing 200 or the panel member 300, instead of the ECU 160, wherein the ECU 160 would then provide a detected failure signal to the corresponding indicator element 302. In other instances, the diagnostic device may be configured such that the indicator element(s) 302 are remotely disposed with respect to the panel member 300, but are in communication with the indicia(s) 304 thereof, for example, by optical elements such as fiber optic filaments. As such, one skilled in the art will appreciate that the perceptible identification of the failed or faulty operational component can be achieved in many different manners consistently with the scope of the present disclosure.

Aspects of the diagnostic device can thus be beneficial to the consumer as well as the serviceman. For example, in the event of a problem with the dishwasher device 100, the consumer may merely remove the toe kick panel and advise the service company of the faulty operational component needing replacement, prior to the service call. In such a manner, the serviceman knows the identity of the operational component needing replacement, and can bring the same to the service call. This may, for example, reduce warranty costs, eliminate multiple service calls, reduce or eliminate unnecessary component replacements, and improve the efficiency (and lower the cost) of service calls.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A diagnostic device for a washing appliance, comprising:

a control unit in communication with a plurality of operational components of the washing appliance and with at least one control switch device, the control unit being responsive to the at least one control switch device to control the plurality of operational components, the control unit being further configured to monitor an electrical current consumed by the plurality of operational components so as to identify at least one operational component experiencing a failure, and provide an indicia of the failure, whereby interruption of the electrical current associated with at least one of the plurality of operational components is associated with the failure of the at least one of the plurality of operational components; and a panel member associated with the control unit, the panel member including an indicia of the at least one operational component experiencing the failure, the at least one operational component indicia being configured to cooperate with the corresponding failure indicia so as to provide a perceptible identification of the at least one operational component experiencing the failure.

2. A device according to claim 1, wherein the control unit is disposed within a control unit housing assembly, and the control unit housing assembly comprises the panel member.

3. A device according to claim 2, wherein the panel member is operably engaged with the control unit housing assembly such that the panel member forms an externally-visible surface of the control unit housing assembly whereby the perceptible identification is viewable without accessing the control unit within the control unit housing assembly.

4. A device according to claim 2, wherein the control unit housing assembly is adapted to be disposed about a forward side of the washing appliance such that the panel member is accessible and viewable from the forward side.

5. A device according to claim 1, wherein the control unit further comprises a current-measuring device for monitoring the electrical current consumed by the plurality of operational components.

6. A device according to claim 5, wherein the current-measuring device is an ammeter device.

7. A device according to claim 1, further comprising an indicator element operably engaged with the control unit for providing the failure indicia.

8. A device according to claim 7, wherein the indicator element further comprises a light source configured to emit light as the failure indicia.

9. A device according to claim 8, wherein the panel member is further configured to be in communication with the light source such that the emitted light associated with the failure indicia is transmitted through the panel member, in association with the corresponding at least one operational component indicia, so as to provide the perceptible identification of the at least one operational component experiencing the failure.

10. A device according to claim 8, wherein the light source further comprises a light-emitting diode.

11. A device according to claim 1, wherein the plurality of operational components comprises at least two of: a main wash pump, a drain valve, a drain pump, an upper drying fan, a lower drying fan, a thermister, a turbidity sensor, a water valve, an internal water heater, or an inline water heater.

12. A device according to claim 1, wherein the plurality of operational components comprises: a main wash pump, a drain valve, a drain pump, a drying fan, a thermister, a turbidity sensor, a water valve, and a water heater.

13. A washing appliance, comprising:
a plurality of operational components;
at least one control switch device;
a control unit in communication with the a plurality of operational components and with the at least one control switch device, the control unit being responsive to the at least one control switch device to control the plurality of operational components, the control unit being further configured to monitor an electrical current consumed by the plurality of operational components so as to identify at least one operational component experiencing a failure, and provide an indicia of the failure, whereby interruption of the electrical current associated with at least one of the plurality of operational components is associated with the failure of the at least one of the plurality of operational components; and a panel member associated with the control unit, the panel member including an indicia of the at least one operational component experiencing the failure, the at least one operational component indicia being configured to cooperate with the corresponding failure indicia so as to provide a perceptible identification of the at least one operational component experiencing the failure.

14. A washing appliance according to claim 13, wherein the control unit is disposed within a control unit housing assembly, and the control unit housing assembly comprises the panel member.

15. A washing appliance according to claim 14, wherein the panel member is operably engaged with the control unit housing assembly such that the panel member forms an externally-visible surface of the control unit housing assembly whereby the perceptible identification is viewable without accessing the control unit within the control unit housing assembly.

16. A washing appliance according to claim 14, wherein the control unit housing assembly is disposed about a forward side of the washing appliance such that the panel member is accessible and viewable from the forward side.

17. A washing appliance according to claim 13, wherein the control unit further comprises a current-measuring device for monitoring the electrical current consumed by the plurality of operational components.

18. A washing appliance according to claim 17, wherein the current-measuring device is an ammeter device.

19. A washing appliance according to claim 13, further comprising an indicator element operably engaged with the control unit for providing the failure indicia.

20. A washing appliance according to claim 19, wherein the indicator element further comprises a light source configured to emit light as the failure indicia.

21. A washing appliance according to claim 20, wherein the panel member is further configured to be in communication with the light source such that the emitted light associated with the failure indicia is transmitted through the panel member, in association with the corresponding at least one operational component indicia, so as to provide the perceptible identification of the at least one operational component experiencing the failure.

22. A washing appliance according to claim 20, wherein the light source further comprises a light-emitting diode.

23. A method of identifying component failure in a washing appliance, comprising:
identifying a failure of at least one of a plurality of operational components of the washing appliance by monitoring an electrical current consumed by the plurality of operational components with a control unit, the control unit being in communication with at least one control switch device and responsive thereto to control the plurality of operational components, and providing an indicia of the failure, whereby interruption of the electrical current associated with at least one of the plurality of operational components is associated with the failure of the at least one of the plurality of operational components; and communicating the failure indicia with an indicia of the corresponding at least one operational component experiencing the failure, the at least one operational component indicia being operably engaged with a panel member associated with the control unit, so as to provide a perceptible identification of the at least one operational component experiencing the failure.

24. A method according to claim 23, further comprising disposing the control unit within a control unit housing assembly comprising the panel member.

25. A method according to claim 24, further comprising operably engaging the panel member with the control unit housing assembly such that the panel member forms an externally-visible surface of the control unit housing assembly whereby the perceptible identification is viewable without accessing the control unit within the control unit housing assembly.

26. A method according to claim 24, further comprising disposing the control unit housing assembly about a forward side of the washing appliance such that the panel member is accessible and viewable from the forward side.

27. A method according to claim 23, wherein monitoring an electrical current consumed by the plurality of operational components further comprises monitoring the electrical current consumed by the plurality of operational components with a current-measuring device associated with the control unit.

28. A method according to claim 27, wherein the current-measuring device is an ammeter device.

29. A method according to claim 23, wherein providing an indicia of the failure further comprises providing an indicia of the failure with an indicator element operably engaged with the control unit.

30. A method according to claim 29, wherein providing an indicia of the failure with an indicator element further comprises providing an indicia of the failure with an indicator element comprising a light source configured to emit light as the failure indicia.

31. A method according to claim 30, wherein the panel member is further configured to be in communication with the light source, and the method further comprises transmitting the emitted light associated with the failure indicia through the panel member, in association with the corresponding at least one operational component indicia, so as to provide the perceptible identification of the at least one operational component experiencing the failure.

32. A method according to claim 30, wherein providing an indicia of the failure with an indicator element comprising a light source further comprises providing an indicia of the failure with an indicator element comprising a light-emitting diode.

* * * * *